US012717265B2

(12) United States Patent
Yamada et al.

(10) Patent No.: US 12,717,265 B2
(45) Date of Patent: Aug. 25, 2026

(54) IMAGE FORMING APPARATUS HAVING A PHOTORECEPTOR WITH INORGANIC SURFACE LAYER AND A CLEANING BLADE

(71) Applicant: FUJIFILM Business Innovation Corp., Tokyo (JP)

(72) Inventors: Yoshiteru Yamada, Kanagawa (JP); Daisuke Tano, Kanagawa (JP); Yuka Kawamoto, Kanagawa (JP); Misaki Komura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 19/043,528

(22) Filed: Feb. 3, 2025

(65) Prior Publication Data

US 2026/0016784 A1 Jan. 15, 2026

(30) Foreign Application Priority Data

Jul. 11, 2024 (JP) ................................ 2024-112012

(51) Int. Cl.
*G03G 21/00* (2006.01)
*G03G 5/147* (2006.01)

(52) U.S. Cl.
CPC ..... *G03G 21/0017* (2013.01); *G03G 5/14704* (2013.01); *G03G 2215/00957* (2013.01); *G03G 2215/00962* (2013.01)

(58) Field of Classification Search
USPC ........................................................ 399/111
See application file for complete search history.

(56) References Cited

U.S. PATENT DOCUMENTS 8,019,268 B2 9/2011 Nakamatsu et al.
11,892,780 B1 2/2024 Yamada et al.
(Continued)

FOREIGN PATENT DOCUMENTS

JP 2022106478 7/2022
JP 2024017062 2/2024
JP 2024027443 3/2024

OTHER PUBLICATIONS

"Search Report of Europe Counterpart Application", issued on Jul. 16, 2025, p. 1-p. 7.

*Primary Examiner* — Quana Grainger
(74) *Attorney, Agent, or Firm* — JCIPRNET

(57) ABSTRACT

An image forming apparatus includes a photoreceptor; a charging device that charges a surface of the photoreceptor; an electrostatic latent image forming device that forms an electrostatic latent image on the surface of the photoreceptor; a developing device that contains a developer containing a toner and develops the electrostatic latent image formed on the surface of the photoreceptor to form a toner image; a transfer device that transfers the toner image to a surface of a recording medium; and a cleaning device that has a cleaning blade coming into contact with the surface of the photoreceptor to clean the surface of the photoreceptor, in which the photoreceptor has an inorganic surface layer containing a Group 13 element and an oxygen element, the cleaning blade has an impregnated cured layer of an isocyanate compound and a silicone-modified acrylic polymer at a contact portion in contact with the surface of the photoreceptor, a 100% modulus of the cleaning blade is 13 MPa or more and 22 MPa or less, a tip angle of the cleaning blade is 60 degrees or more and 87 degrees or less, and an action angle of the cleaning blade with respect to the surface of the photoreceptor is 8 degrees or more and 30 degrees or less.

7 Claims, 4 Drawing Sheets

(56) References Cited

U.S. PATENT DOCUMENTS

| | | | | |
|---|---|---|---|---|
| 12,025,943 | B2 | 7/2024 | Shingu et al. | |
| 2024/0053701 | A1 * | 2/2024 | Watanabe ............ | G03G 15/161 |

* cited by examiner

IMAGE FORMING APPARATUS HAVING A PHOTORECEPTOR WITH INORGANIC SURFACE LAYER AND A CLEANING BLADE

CROSS-REFERENCE TO RELATED APPLICATIONS

This application is based on and claims priority under 35 USC 119 from Japanese Patent Application No. 2024-112012 filed Jul. 11, 2024.

BACKGROUND

(i) Technical Field

The present disclosure relates to an image forming apparatus.

(ii) Related Art

JP2022-106478A discloses an electrophotographic image forming system including at least a step of forming an electrostatic latent image on a photoreceptor, a step of developing the electrostatic latent image with an electrostatic charge image developing toner, and a step of removing the electrostatic charge image developing toner by bringing a tip ridge line portion of a cleaning blade into pressure-contact with a surface of the photoreceptor, in which a thermoplastic resin having electron acceptivity is contained in a surface layer of the photoreceptor, a fatty acid metal salt is contained in toner particles configuring the electrostatic charge image developing toner as an external additive, and the tip ridge line portion of the cleaning blade, having an edge angle of 90° to 130°, is brought into pressure-contact with the surface of the photoreceptor, and an effective contact angle of the cleaning blade is 7° to 20°.

JP2024-017062A discloses a cleaning blade composed of a polyurethane rubber member, having an impregnated cured layer of an isocyanate compound at a contact portion that comes into contact with a cleaning target member, in which a Young's modulus of the contact portion is 14 MPa or more and 25 MPa or less, and a tip angle is 55 degrees or more and 80 degrees or less.

JP2024-027443A discloses an image forming apparatus including a cleaning blade in which a 100% modulus at a temperature of 23° C. is 17 MPa or more and 23 MPa or less.

SUMMARY

Aspects of non-limiting embodiments of the present disclosure relate to provide an image forming apparatus that has excellent abrasion resistance of a photoreceptor and abrasion resistance of a cleaning blade, in which filming is unlikely to occur on a surface of the photoreceptor.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific methods for achieving the above-described object include the following.

According to an aspect of the present disclosure, there is provided an image forming apparatus including:

a photoreceptor;

a charging device that charges a surface of the photoreceptor;

an electrostatic latent image forming device that forms an electrostatic latent image on the surface of the photoreceptor;

a developing device that contains a developer containing a toner and develops the electrostatic latent image formed on the surface of the photoreceptor to form a toner image;

a transfer device that transfers the toner image to a surface of a recording medium; and a cleaning device that has a cleaning blade coming into contact with the surface of the photoreceptor to clean the surface of the photoreceptor, in which the photoreceptor has an inorganic surface layer containing a Group 13 element and an oxygen element, the cleaning blade has an impregnated cured layer of an isocyanate compound and a silicone-modified acrylic polymer at a contact portion in contact with the surface of the photoreceptor, a 100% modulus of the cleaning blade is 13 MPa or more and 22 MPa or less, a tip angle of the cleaning blade is 60 degrees or more and 87 degrees or less, and an action angle of the cleaning blade with respect to the surface of the photoreceptor is 8 degrees or more and 30 degrees or less.

BRIEF DESCRIPTION OF THE DRAWINGS

Exemplary embodiment(s) of the present invention will be described in detail based on the following figures, wherein.

DETAILED DESCRIPTION

Figure 1:
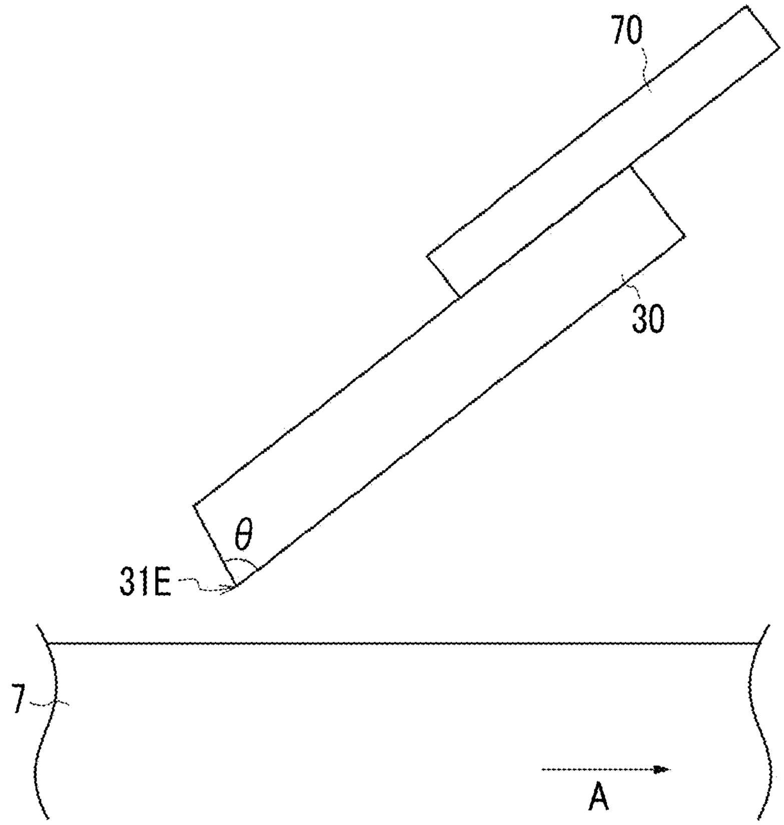
FIG. 1 is a schematic configuration view showing an example of a cleaning blade according to the present exemplary embodiment.

The exemplary embodiments of the present disclosure will be described below. The following descriptions and examples merely illustrate the exemplary embodiments, and do not limit the scope of the exemplary embodiments.

In the present disclosure, a numerical range described using "to" represents a range including numerical values listed before and after "to" as the minimum value and the maximum value respectively.

Regarding the numerical ranges described in stages in the present disclosure, the upper limit or lower limit of a numerical range may be replaced with the upper limit or lower limit of another numerical range described in stages. Furthermore, in the present disclosure, the upper limit or lower limit of a numerical range may be replaced with values described in examples.

In the present disclosure, the term “step” includes not only an independent step but a step that is not clearly distinguished from other steps as long as the purpose of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of corresponding substances. In a case where the amount of each component in a composition is mentioned in the present disclosure, and there are two or more kinds of substances corresponding to each component in the composition, unless otherwise specified, the amount of each component means the total amount of two or more kinds of the substances present in the composition.

In the present disclosure, each component may include two or more kinds of corresponding particles. In a case where there are two or more kinds of particles corresponding to each component in a composition, unless otherwise specified, the particle size of each component means a value for a mixture of two or more kinds of the particles present in the composition.

In the present disclosure, an alkyl group and an alkylene group are any of linear, branched, or cyclic, unless otherwise specified.

In the present disclosure, a hydrogen atom in an organic group, an aromatic ring, a linking group, an alkyl group, an alkylene group, an aryl group, an aralkyl group, an alkoxy group, an aryloxy group, and the like may be substituted with a halogen atom.

In the present disclosure, in a case where a compound is represented by a structural formula, the compound may be represented by a structural formula in which symbols representing a carbon atom and a hydrogen atom (C and H) in a hydrocarbon group and/or a hydrocarbon chain are omitted.

In the present disclosure, “(meth)acrylic” is an expression including both acrylic and methacrylic, and “(meth)acrylate” is an expression including both acrylate and methacrylate.

In the present disclosure, “constitutional unit” of a copolymer or a resin is the same as a monomer unit.

In the present disclosure, “photoreceptor” refers to “electrophotographic photoreceptor”.

In the present disclosure, “axial direction” of the photoreceptor means a direction in which a rotation axis of the photoreceptor extends, and “circumferential direction” of the photoreceptor means a rotation direction of the photoreceptor.

Image Forming Apparatus

The image forming apparatus according to the present exemplary embodiment includes a photoreceptor, a charging device that charges a surface of the photoreceptor, an electrostatic latent image forming device that forms an electrostatic latent image on the surface of the photoreceptor, a developing device that contains a developer containing a toner and develops the electrostatic latent image formed on the surface of the photoreceptor to form a toner image, a transfer device that transfers the toner image to a surface of a recording medium, and a cleaning device that has a cleaning blade coming into contact with the surface of the photoreceptor to clean the surface of the photoreceptor.

In the image forming apparatus according to the present exemplary embodiment, the photoreceptor has an inorganic surface layer containing a Group 13 element and an oxygen element, the cleaning blade has an impregnated cured layer of an isocyanate compound and a silicone-modified acrylic polymer at a contact portion in contact with the surface of the photoreceptor, a 100% modulus of the cleaning blade is 13 MPa or more and 22 MPa or less, a tip angle of the cleaning blade is 60 degrees or more and 87 degrees or less, and an action angle of the cleaning blade with respect to the surface of the photoreceptor is 8 degrees or more and 30 degrees or less.

In the present disclosure, the 100% modulus of the cleaning blade is a value measured by the following measurement method.

A tensile test is performed in accordance with JIS K 6251:2017 “Testing methods for vulcanized rubber and thermoplastic rubber-Tensile properties”. A shape of the test piece is a No. 3 dumbbell shape. Before the tensile test, the test piece is left in an environment at a temperature of 23° C. and a relative humidity of 55% for one day or more. A stress at 100% elongation is measured by performing a test at a tensile rate of 500 mm/min using an automatic tensile testing machine Strograph AE Elastomer (Toyo Seiki Seisaku-sho, Ltd.) in an environment at a temperature of 23° C. and a relative humidity of 55%. A value obtained by dividing the stress at 100% elongation by an initial cross-sectional area of the test piece is the 100% modulus. The values of the 100% modulus of the plurality of test pieces are averaged.

A method of collecting the test piece is as follows.

A longitudinal direction of the cleaning blade (direction parallel to an axial direction of the photoreceptor) and a longitudinal direction of the test piece (direction of tension) are matched, and the test piece is collected. A thickness of the test piece is the thickness of the cleaning blade. The number of test pieces is two, three, or four, depending on the length of the cleaning blade.

The tip angle and the action angle of the cleaning blade according to the present disclosure will be described with reference to FIGS. 1 and 2.

Figure 2:
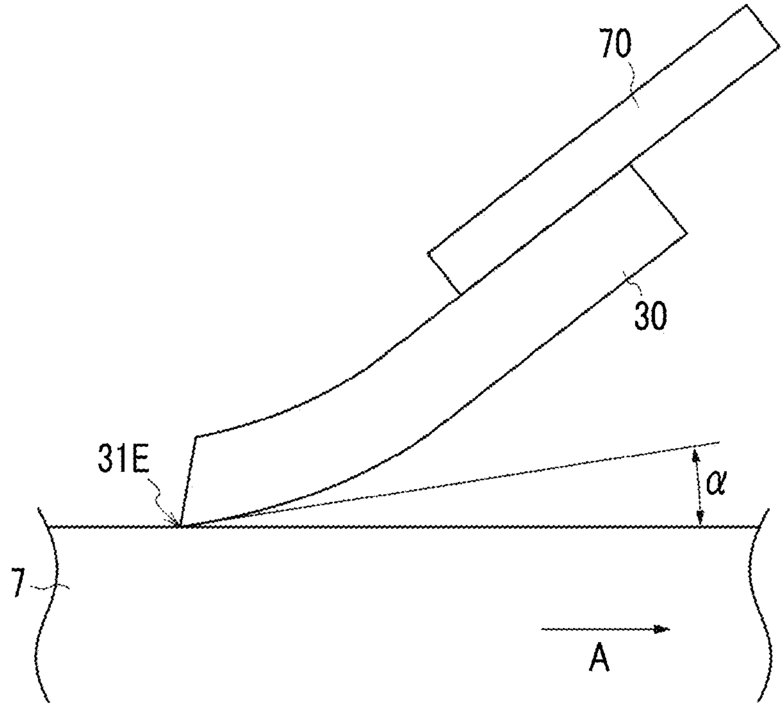
FIG. 2 is a schematic configuration view showing the example of the cleaning blade according to the present exemplary embodiment.

FIGS. 1 and 2 are schematic configuration views showing an example of a cleaning blade included in a photoreceptor cleaning device of the image forming apparatus according to the present exemplary embodiment.

FIG. 1 shows a cleaning blade 30 in a state of not being in contact with an outer peripheral surface of a photoreceptor 7.

FIG. 2 shows a state in which the cleaning blade 30 shown in FIG. 1 is in contact with the outer peripheral surface of the photoreceptor 7 for performing cleaning.

FIGS. 1 and 2 are cross-sectional views parallel to a rotation direction (that is, an arrow A direction) of the photoreceptor 7.

A support member 70 is joined to the cleaning blade 30. A pressing member (not shown) is joined to the support member 70. The pressing member presses the support member 70, and thus the cleaning blade 30 is pressed against the photoreceptor 7.

A corner portion 31E of the cleaning blade 30 and the vicinity thereof are contact portions that come into contact with the outer peripheral surface of the rotating photoreceptor 7 to clean the surface of the photoreceptor 7.

The tip angle of the cleaning blade 30 is an angle θ of the corner portion 31E in a state of not being in contact with the outer peripheral surface of the photoreceptor 7.

In a case where the cleaning blade 30 cleans the photoreceptor 7, the cleaning blade 30 is pressed against the photoreceptor 7, and thus at least the tip portion sags and draws an arc. An angle formed by a tangent line with respect to the cleaning blade 30 and a tangent line with respect to the photoreceptor 7, passing through a contact point between the cleaning blade 30 and the photoreceptor 7 (a downstream side edge of the contact portion), is an action angle α.

With an image forming apparatus according to the present exemplary embodiment, abrasion resistance of the photoreceptor and abrasion resistance of the cleaning blade are excellent, and filming (forming a film) is unlikely to occur on a surface of the photoreceptor. The mechanism is considered as follows.

The photoreceptor having an inorganic surface layer and the cleaning blade having an impregnated cured layer at a contact portion with the photoreceptor are known, respectively.

The above-described photoreceptor has a low dynamic friction force on an outer peripheral surface. In addition, the above-described cleaning blade also has a low dynamic frictional force of the contact portion with the photoreceptor. r. Therefore, in a case where the above-described photoreceptor and the above-described cleaning blade are combined, both the photoreceptor and the cleaning blade are expected to be suppressed from being worn, and life of the photoreceptor and the cleaning blade is expected to be dramatically extended.

However, in the above-described combination, since a frictional resistance between the photoreceptor and the cleaning blade is extremely low, the cleaning blade slides on the photoreceptor, and cleaning function is not sufficiently exhibited. As a result, a toner external additive slips through the cleaning blade, and filming derived from the external additive occurs on the surface of the photoreceptor.

With regard to the above-described problem, in the image forming apparatus according to the present exemplary embodiment, the 100% modulus and the tip angle of the cleaning blade and the action angle of the cleaning blade with respect to the surface of the photoreceptor are controlled.

In the present exemplary embodiment, the 100% modulus of the cleaning blade is 13 MPa or more and 22 MPa or less.

In a case where the 100% modulus of the cleaning blade is less than 13 MPa, a mechanical strength of the cleaning blade is insufficient, the contact portion of the cleaning blade is turned up, the external additive slips through, and the filming occurs on the surface of the photoreceptor. From the viewpoint of suppressing the phenomenon, the 100% modulus of the cleaning blade is, for example, preferably 13 MPa or more, more preferably 14 MPa or more, and still more preferably 15 MPa or more.

In a case where the 100% modulus of the cleaning blade is more than 22 MPa, the mechanical strength of the cleaning blade is too strong, the external additive slips through the contact portion of the cleaning blade and is not sufficiently pressed against the surface of the photoreceptor, and the filming occurs on the surface of the photoreceptor. From the viewpoint of suppressing the phenomenon, the 100% modulus of the cleaning blade is 22 MPa or less, for example, preferably 20 MPa or less and more preferably 18 MPa or less.

The 100% modulus of the cleaning blade can be controlled, for example, by using urethane rubber as a base material of the cleaning blade and controlling a content ratio of a hard segment and a soft segment in the urethane rubber.

In the present exemplary embodiment, the tip angle of the cleaning blade is 60 degrees or more and 87 degrees or less.

In a case where the tip angle of the cleaning blade is less than 60 degrees, the contact portion of the cleaning blade is turned up, the external additive slips through, and the filming occurs on the surface of the photoreceptor. From the viewpoint of suppressing the phenomenon, the tip angle of the cleaning blade is 60 degrees or more, for example, preferably 70 degrees or more, more preferably 75 degrees or more, and still more preferably 80 degrees or more.

In a case where the tip angle of the cleaning blade is more than 87 degrees, the contact portion of the cleaning blade slides on the photoreceptor, so that the external additive slips through and the filming occurs on the surface of the photoreceptor. From the viewpoint of suppressing the phenomenon, the tip angle of the cleaning blade is 87 degrees or less, for example, preferably 85 degrees or less.

The tip angle of the cleaning blade can be controlled by processing the tip of the blade base material. Examples of the processing method include laser processing and grinding processing.

In the present exemplary embodiment, the action angle of the cleaning blade with respect to the surface of the photoreceptor is 8 degrees or more and 30 degrees or less.

In a case where the action angle of the cleaning blade is less than 8 degrees, the contact portion of the cleaning blade is not sufficiently pressed against the surface of the photoreceptor, so that the external additive slips through and the filming occurs on the surface of the photoreceptor. From the viewpoint of suppressing the phenomenon, the action angle of the cleaning blade is 8 degrees or more, for example, preferably 10 degrees or more and more preferably 12 degrees or more.

In a case where the action angle of the cleaning blade is more than 30 degrees, the contact portion of the cleaning blade is turned up, the external additive slips through, and the filming occurs on the surface of the photoreceptor. From the viewpoint of suppressing the phenomenon, the action angle of the cleaning blade is 30 degrees or less, for example, preferably 28 degrees or less.

The action angle of the cleaning blade with respect to the surface of the photoreceptor can be controlled by an angle at which the cleaning blade is brought into contact with the photoreceptor and a pressing pressure.

In the image forming apparatus according to the present exemplary embodiment, for example, it is preferable that a coefficient of dynamic friction between the surface of the photoreceptor and the contact portion of the cleaning blade is 0.3 or more and 0.6 or less.

In a case where the coefficient of dynamic friction is 0.3 or more, the contact portion of the cleaning blade sufficiently exhibits the cleaning function and suppresses the occurrence of filming on the surface of the photoreceptor. From the viewpoint of suppressing the occurrence of filming on the surface of the photoreceptor, the coefficient of dynamic friction is, for example, more preferably 0.4 or more, and still more preferably 0.5 or more.

In a case where the coefficient of dynamic friction is 0.6 or less, the photoreceptor and the cleaning blade are less likely to be worn. From the viewpoint of improving the abrasion resistance of the photoreceptor and the abrasion resistance of the cleaning blade, the coefficient of dynamic friction is, for example, preferably 0.6 or less.

The coefficient of dynamic friction between the surface of the photoreceptor and the contact portion of the cleaning blade can be controlled by the 100% modulus and the tip angle of the cleaning blade and the action angle of the cleaning blade with respect to the surface of the photoreceptor.

In the present exemplary embodiment, a method of measuring the coefficient of dynamic friction between the surface of the photoreceptor and the contact portion of the cleaning blade is as follows.

A length of the cleaning blade in the longitudinal direction (direction parallel to the axial direction of the photoreceptor) is cut to 10 mm from approximately 5 locations in the longitudinal direction of the cleaning blade, and samples are collected. A shape of the sample is approximately a rectangular parallelepiped (since the tip angle is 60 degrees or more and 87 degrees or less, the sample is not a complete rectangular parallelepiped).

Before the test, the test piece is left in an environment at a temperature of 23° C. and a relative humidity of 55% for one day or more. The following test is performed in an environment at a temperature of 23° C. and a relative humidity of 55%.

The photoreceptor is installed in a friction force measuring device HEIDON TRIBO GEAR TYPE 14 (Shinto Scientific Co., Ltd.). The test piece is pressed against the photoreceptor. At this time, the contact portion, the action angle, and the pressing pressure of the test piece are the contact portion, the action angle, and the pressing pressure of the actual cleaning blade that comes into contact with the surface of the photoreceptor. That is, a state during the action of the cleaning blade is reproduced.

The photoreceptor is rotated at a speed of 100 mm/sec. A rotation direction of the photoreceptor is a direction in which the actual photoreceptor rotates. A dynamic frictional force acting on the photoreceptor during the rotation is measured to obtain the coefficient of dynamic friction. Coefficients of dynamic friction of five test pieces are averaged.

From the viewpoint of suppressing the occurrence of the filming on the surface of the photoreceptor, the pressing pressure of the cleaning blade against the photoreceptor is, for example, preferably 1 gf/mm or more, more preferably 1.5 gf/mm or more, and still more preferably 2 gf/mm or more.

From the viewpoint of stabilizing the behavior of the tip of the cleaning blade and ensuring the cleaning performance, the pressing pressure of the cleaning blade against the photoreceptor is, for example, preferably 5 gf/mm or less, more preferably 4 gf/mm or less, and still more preferably 3 gf/mm or less.

Hereinafter, a configuration of the image forming apparatus according to the present exemplary embodiment will be described in detail.

The image forming apparatus according to the present exemplary embodiment includes a photoreceptor, a charging device, an electrostatic latent image forming device, a developing device, a transfer device, and a photoreceptor cleaning device.

The image forming apparatus according to the present exemplary embodiment may further include a fixing device that fixes the toner image transferred to the surface of the recording medium, a static elimination device that removes charges by irradiating the surface of the photoreceptor after the transfer of the toner image and before the charging with charge removing light, and the like.

In the image forming apparatus according to the present exemplary embodiment, a portion including the photoreceptor may have a cartridge structure (process cartridge) that is attachable to and detachable from the image forming apparatus.

The image forming apparatus according to the present exemplary embodiment may be a direct transfer-type image forming apparatus that directly transfers a toner image formed on the surface of the photoreceptor to a recording medium; or an intermediate transfer-type image forming apparatus that primarily transfers the toner image formed on the surface of the photoreceptor to the surface of an intermediate transfer member and secondarily transfers the toner image transferred to the surface of the intermediate transfer member to the surface of the recording medium. In the intermediate transfer-type apparatus, the transfer device has an intermediate transfer member with surface on which the toner image will be transferred, a primary transfer device that performs primary transfer to transfer the toner image formed on the surface of the photoreceptor to the surface of the intermediate transfer member, and a secondary transfer device that performs secondary transfer to transfer the toner image transferred to the surface of the intermediate transfer member to the surface of a recording medium.

An example of the image forming apparatus according to the present exemplary embodiment will be shown below, but the present invention is not limited thereto. Among the parts shown in the drawing, main parts will be described, and others will not be described.

Figure 3:
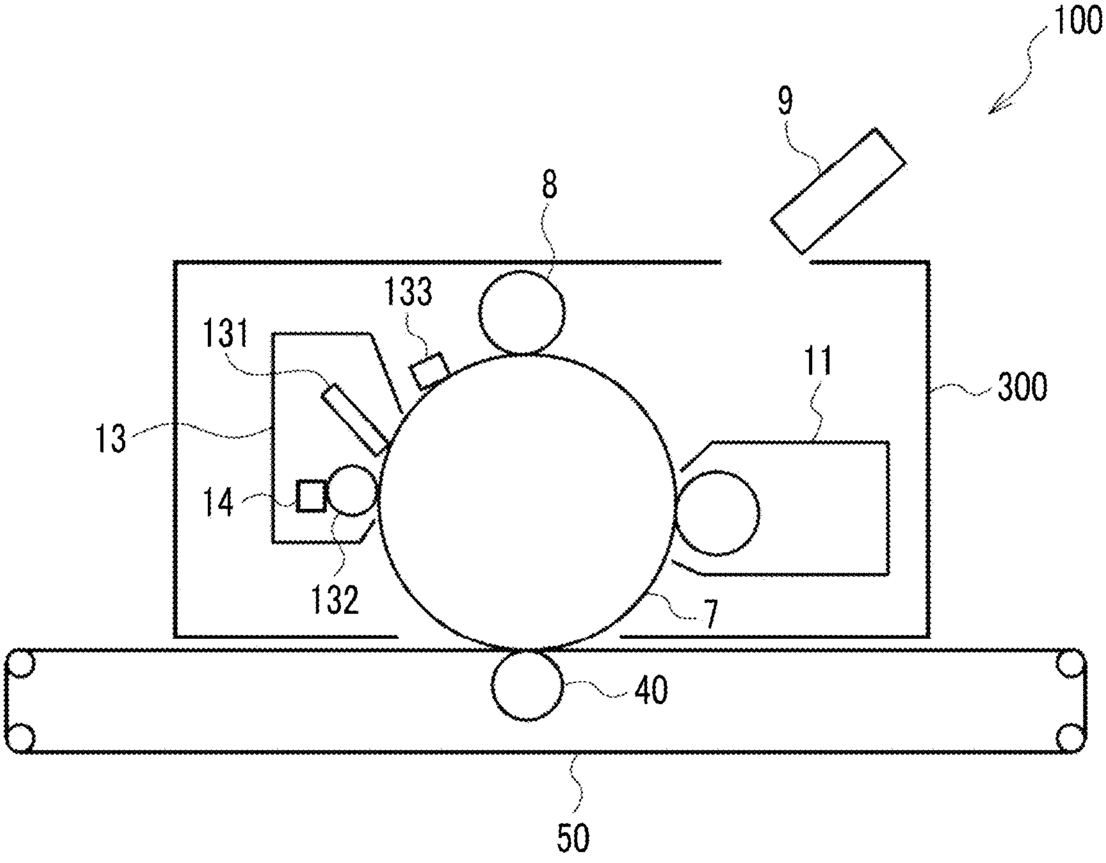
FIG. 3 is a view schematically showing the configuration of an example of an image forming apparatus according to the present exemplary embodiment.

FIG. 3 is a view schematically showing a configuration of an example of the image forming apparatus according to the present exemplary embodiment.

As shown in FIG. 3, an image forming apparatus 100 according to the present exemplary embodiment includes a process cartridge 300 including a photoreceptor 7, an exposure device 9 (an example of the electrostatic latent image forming device), a transfer device 40 (primary transfer device), and an intermediate transfer member 50. In the image forming apparatus 100, the exposure device 9 is disposed at a position that can be exposed to the photoreceptor 7 from an opening portion of the process cartridge 300; the transfer device 40 is disposed at a position that faces the photoreceptor 7 through the intermediate transfer member 50; and the intermediate transfer member 50 is disposed such that a part of the intermediate transfer member 50 is in contact with the photoreceptor 7. Although not shown, the image forming apparatus also includes a secondary transfer device that transfers the toner image transferred to the intermediate transfer member 50 to a recording medium (for example, paper). The intermediate transfer member 50, the transfer device 40 (primary transfer device), and the secondary transfer device (not shown) correspond to an example of the transfer device.

The process cartridge 300 in FIG. 3 integrally supports the photoreceptor 7, a charging device 8 (an example of the charging device), a developing device 11 (an example of the developing device), and a cleaning device 13 (an example of the photoreceptor cleaning device) in a housing. The cleaning device 13 has a cleaning blade (an example of a cleaning member) 131, and the cleaning blade 131 is disposed to come into contact with the surface of the photoreceptor 7.

FIG. 3 shows an example of an image forming apparatus including a fibrous member 132 (roll shape) that supplies a lubricant 14 to the surface of the photoreceptor 7 and a fibrous member 133 (flat brush shape) that assists the cleaning, but these are disposed as necessary.

Figure 4:
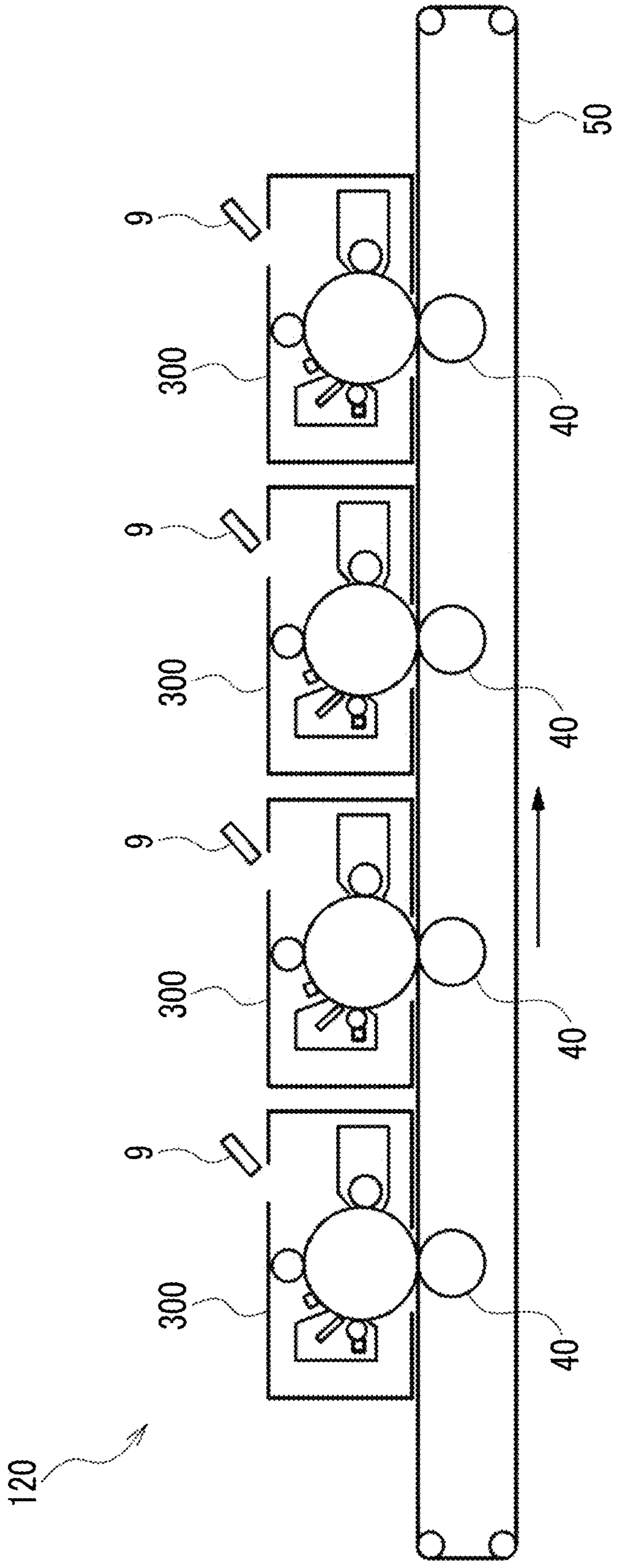
FIG. 4 is a view schematically showing a configuration of another example of the image forming apparatus according to the present exemplary embodiment.

FIG. 4 is a view schematically showing a configuration of another example of the image forming apparatus according to the present exemplary embodiment.

An image forming apparatus 120 shown in FIG. 4 is a tandem type multicolor image forming apparatus in which four process cartridges 300 are mounted. The image forming apparatus 120 is formed such that the four process cartridges 300 are arranged in parallel on the intermediate transfer member 50, and one photoreceptor is used for each color. The image forming apparatus 120 has the same configuration as the image forming apparatus 100, except that the image forming apparatus 120 is of a tandem type.

Hereinafter, each configuration of the image forming apparatus according to the present exemplary embodiment will be described.

Photoreceptor

The photoreceptor 7 has, for example, a conductive substrate, a photosensitive layer disposed on the conductive substrate, and an inorganic surface layer disposed on the photosensitive layer. The photosensitive layer may be a lamination-type photosensitive layer consisting of a charge generation layer and a charge transporting layer, or may be a single layer-type photosensitive layer. Details of the photoreceptor will be described later.

Charging Device

As the charging device 8, for example, a contact-type charger formed of a conductive or semi-conductive charging roller, a charging brush, a charging film, a charging rubber blade, a charging tube, or the like is used. As the charging device 8, for example, a known charger such as a non-contact type roller charger, and a scorotron charger or a corotron charger using corona discharge is also used.

Exposure Device

Examples of the exposure device 9 include an optical system device that exposes the surface of the photoreceptor 7 to light such as a semiconductor laser beam, LED light, and liquid crystal shutter light in a predetermined image pattern. A wavelength of the light source is set to be within a spectral sensitivity region of the photoreceptor. As a wavelength of a semiconductor laser, near infrared laser, which has an oscillation wavelength in the vicinity of 780 nm, is mostly used. However, the wavelength is not limited thereto, and a laser having an oscillation wavelength of an approximately 600 nm level or a laser having an oscillation wavelength of 400 nm or more and 450 nm or less as a blue laser may also be used. In addition, a surface emission-type laser light source capable of outputting a multi-beam is also effective for forming a color image.

Developing Device

Examples of the developing device 11 include a typical developing device that performs development in contact or non-contact with the developer. The developing device 11 is not particularly limited as long as the device has the above-described functions, and is selected depending on the purpose thereof. Examples thereof include known developing machines having a function of attaching a one-component developer or a two-component developer to the photoreceptor 7 using a brush, a roller, or the like. Among the above, for example, a developing roller in which a developer is retained on a surface is preferably used.

The developer used in the developing device 11 may be a one-component developer containing only a toner or a two-component developer containing a toner and a carrier. The developer may be magnetic or non-magnetic. Details of the toner and the developer will be described later.

Cleaning Device

As the cleaning device 13, a cleaning blade-type device including the cleaning blade 131 is used. Details of the cleaning blade will be described later.

Transfer Device

Examples of the transfer device 40 include a known transfer charger such as a contact type transfer charger using a belt, a roller, a film, a rubber blade, or the like, and a scorotron transfer charger or a corotron transfer charger using corona discharge.

Intermediate Transfer Member

As the intermediate transfer member 50, a semi-conductive belt-like intermediate transfer member (intermediate transfer belt) containing polyimide, polyamide-imide, polycarbonate, polyarylate, polyester, rubber, or the like is used. As the form of the intermediate transfer member, a drum-like intermediate transfer member may be used in addition to the belt-like intermediate transfer member.

An operation of forming an image by the image forming apparatus 100 shown in FIG. 3 will be described.

The photoreceptor 7 rotates at a predetermined speed.

The charging device 8 charges the surface of the photoreceptor 7.

For example, a laser beam is emitted from the exposure device 9 to the charged surface of the photoreceptor 7, and an electrostatic latent image is formed on the surface of the photoreceptor 7.

The electrostatic latent image formed on the photoreceptor 7 moves to a developing position as the photoreceptor 7 rotates. At the developing position, the electrostatic latent image on the photoreceptor 7 is developed and visualized by the developing device 11 as a toner image.

The toner image formed on the photoreceptor 7 moves to a primary transfer position as the photoreceptor 7 rotates. At the primary transfer position, a transfer bias is applied to the transfer device 40, an electrostatic force from the photoreceptor 7 toward the transfer device 40 acts on the toner image on the photoreceptor 7, and the toner image is transferred to the intermediate transfer member 50.

The intermediate transfer member 50 travels at a predetermined speed, and the toner image is transferred to the recording medium by the secondary transfer device at a secondary transfer position.

The toner remaining on the surface of the photoreceptor 7 is removed and collected by the cleaning device 13.

Hereinafter, the configuration of the photoreceptor included in the image forming apparatus according to the present exemplary embodiment will be described in detail. In addition, the cleaning blade of the photoreceptor cleaning device included in the image forming apparatus according to the present exemplary embodiment will be described in detail. In addition, the toner and the developer used in the developing device included in the image forming apparatus according to the present exemplary embodiment will be described in detail.

Photoreceptor

An exemplary embodiment of the photoreceptor will be described with reference to FIGS. 5 and 6.

Figure 5:
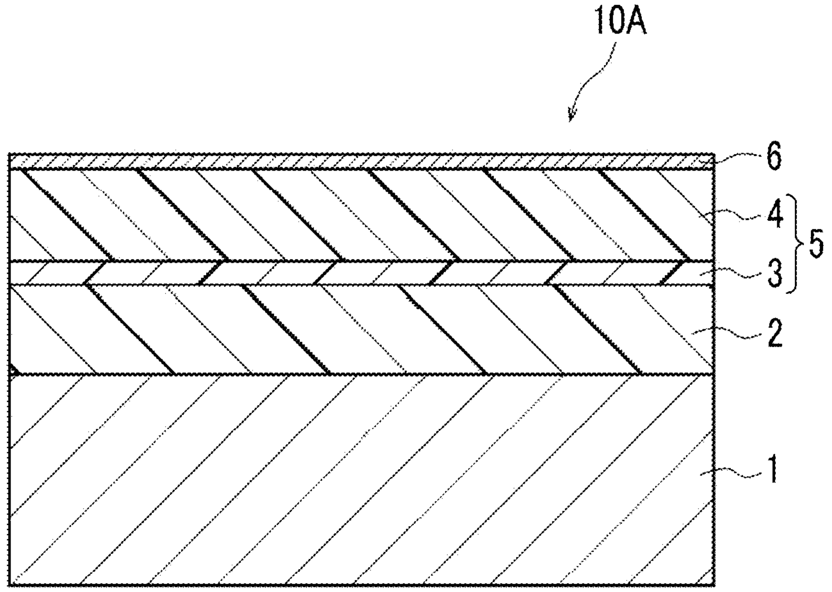
FIG. 5 is a partial cross-sectional view showing an example of a layer configuration of a photoreceptor according to the present exemplary embodiment.

FIG. 5 is a partial cross-sectional view schematically showing an example of a layer configuration of the photoreceptor. A photoreceptor 10A shown in FIG. 5 has a structure in which an undercoat layer 2, a charge generation layer 3, a charge transport layer 4, and an inorganic surface layer 6 are laminated in this order on a conductive substrate 1, and the charge generation layer 3 and the charge transport layer 4 constitute a photosensitive layer 5 (so-called lamination-type photosensitive layer). In the photoreceptor 10A, the inorganic surface layer 6 is disposed to be in contact with the charge transport layer 4. The photoreceptor 10A may include an interlayer (not shown) between the undercoat layer 2 and the charge generation layer 3. The undercoat layer 2 may or may not be provided.

Figure 6:
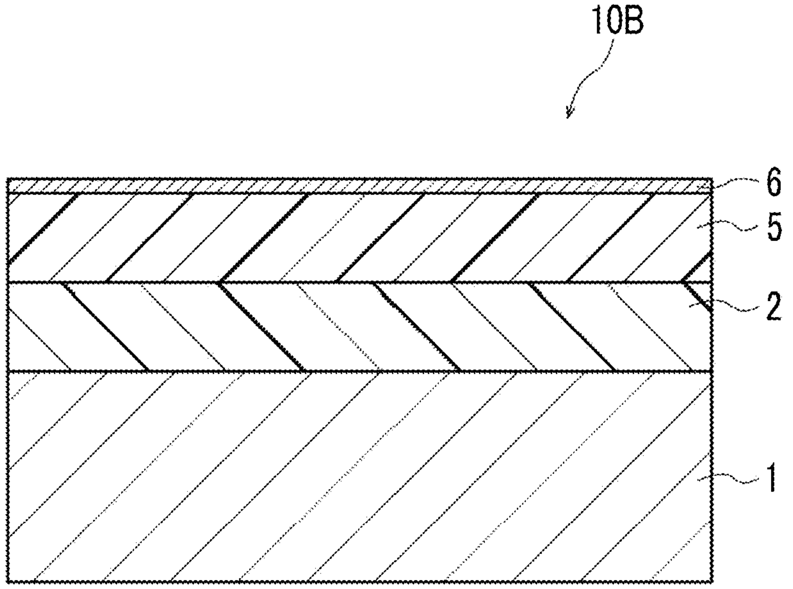
FIG. 6 is a partial cross-sectional view showing another example of the layer configuration of the photoreceptor according to the present exemplary embodiment.

FIG. 6 is a partial cross-sectional view schematically showing another example of the layer configuration of the photoreceptor. A photoreceptor 10B shown in FIG. 6 has a structure in which an undercoat layer 2, a single layer-type photosensitive layer 5, and an inorganic surface layer 6 are laminated in this order on a conductive substrate 1. In the photoreceptor 10B, the inorganic surface layer 6 is disposed to be in contact with the single layer-type photosensitive layer 5. The photoreceptor 10B may include an interlayer (not shown) between the undercoat layer 2 and the charge generation layer 3. The undercoat layer 2 may or may not be provided.

Inorganic Surface Layer

The inorganic surface layer is an inorganic material layer and is a layer containing a Group 13 element and an oxygen element. As the Group 13 element, for example, at least one kind selected from the group consisting of boron, aluminum, gallium, and indium is preferable. The inorganic surface layer may contain one or more Group 13 elements.

The total amount of the Group 13 element and the oxygen element in all elements of the inorganic surface layer is, for example, preferably 95% by atoms or more, more preferably 98% by atoms or more, and ideally 100% by atoms.

The element analysis of the inorganic surface layer is performed by Rutherford Backscattering Spectrometry.

From the viewpoint of low friction, abrasion resistance, and electrical characteristics, the inorganic surface layer is, for example, preferably a layer containing an oxide of the Group 13 element. As the oxide of the Group 13 element, for example, at least one selected from the group consisting of boron oxide, aluminum oxide, gallium oxide, and indium oxide is preferable. The inorganic surface layer may contain one or more oxides of the Group 13 element.

From the viewpoint of low friction, abrasion resistance, and electrical characteristics, the inorganic surface layer is, for example, more preferably a gallium oxide layer or an aluminum oxide layer, and is particularly preferably a gallium oxide layer.

From the viewpoint of maintaining an electrostatic latent image, a volume resistivity of the inorganic surface layer is, for example, preferably $1.0\times10^{10}$ Ω·cm or more, and more preferably $1.0\times10^{11}$ Ω·cm or more.

In the present disclosure, a method of measuring the volume resistivity of the inorganic surface layer is as follows.

The inorganic surface layer is peeled off from the photoreceptor and used as a sample. The sample is sandwiched in a sample holder of an impedance analyzer (Toyo Corporation), the resistance value is measured at an AC voltage of 1 V and a frequency of 100 Hz, and the calculation is performed based on the area of an electrode and the thickness of the sample.

Examples of a method of forming the inorganic surface layer include known vapor phase film forming methods such as plasma chemical vapor deposition (CVD), organic metal vapor phase growth, molecular beam epitaxy, vapor deposition, and sputtering. For example, the inorganic surface layer can be formed by applying the plasma CVD film deposition device and film deposition conditions described in JP2014-191179A.

From the viewpoint of abrasion resistance and electrical characteristics, a layer thickness of the inorganic surface layer is, for example, preferably 0.2 μm or more and 10 μm or less, more preferably 0.4 μm or more and 8 μm or less, and still more preferably 0.6 μm or more and 6 μm or less.

Conductive Substrate

Examples of the conductive substrate include metal plates, metal drums, metal belts, or the like, containing a metal (such as aluminum, copper, zinc, chromium, nickel, molybdenum, vanadium, indium, gold, and platinum) or an alloy (such as stainless steel). In addition, examples of the conductive substrate also include paper, a resin film, a belt, or the like, that is obtained by being coated, vapor-deposited, or laminated with a conductive compound (such as a conductive polymer and indium oxide), a metal (such as aluminum, palladium, and gold) or an alloy. Here, the term "conductive" denotes that a volume resistivity is less than $1\times10^{13}$ Ω·cm.

In a case where the photoreceptor is used in a laser printer, for example, it is preferable that a surface of the conductive substrate is roughened such that a centerline average roughness Ra thereof is 0.04 μm or more and 0.5 μm or less for the purpose of suppressing interference fringes from occurring in a case of irradiation with laser beams. In a case where incoherent light is used as a light source, roughening of the surface to prevent the interference fringes is not particularly necessary, and it is appropriate for longer life because occurrence of defects due to the roughness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by the anodization is chemically active in a natural state, is easily contaminated, and has a large resistance fluctuation depending on the environment. Therefore, for example, it is preferable that a sealing treatment is performed on the porous anodized film so that micropores of the oxide film are closed by volume expansion due to a hydration reaction in pressurized steam or boiling water (a metal salt such as nickel may be added thereto) for a change into a more stable a hydrous oxide.

A film thickness of the anodized film is, for example, preferably 0.3 μm or more and 15 μm or less. In a case where the film thickness is within the above-described range, barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. As a blending proportion of the phosphoric acid, chromic acid, and hydrofluoric acid to the acidic treatment liquid, for example, a concentration of the phosphoric acid may be in a range of 10% by mass or more and 11% by mass or less, a concentration of the chromic acid may be in a range of 3% by mass or more and 5% by mass or less, and a concentration of the hydrofluoric acid may be in a range of 0.5% by mass or more and 2% by mass or less, and a concentration of all of these acids may be in a range of 13.5% by mass or more and 18% by mass or less. A treatment temperature is, for example, preferably 42° C. or higher and 48° C. or lower. A film thickness of a coating film is preferably 0.3 μm or more and 15 μm or less.

The boehmite treatment is carried out, for example, by dipping the base material in pure water at 90° C. or higher and 100° C. or lower for 5 minutes to 60 minutes, or by bringing the base material into contact with heated steam at 90° C. or higher and 120° C. or lower for 5 minutes to 60 minutes. A film thickness of the coating film is, for example, preferably 0.1 μm or more and 5 μm or less. The coating film may be further subjected to an anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $1\times10^2$ Ω·cm or more and $1\times10^{11}$ Ω·cm or less.

Among the above, as the inorganic particles having the above-described resistance value, for example, metal oxide particles such as tin oxide particles, titanium oxide particles, zinc oxide particles, and zirconium oxide particles may be used, and zinc oxide particles are particularly preferable.

A specific surface area of the inorganic particles, measured by a BET method, may be, for example, 10 $m^2$/g or more.

A volume-average particle diameter of the inorganic particles may be 50 nm or more and 2,000 nm or less (for example, preferably 60 nm or more and 1,000 nm or less).

A content of the inorganic particles is, for example, preferably 10% by mass or more and 80% by mass or less, and more preferably 40% by mass or more and 80% by mass or less with respect to the binder resin.

The inorganic particles may be subjected to a surface treatment. As the inorganic particles, two or more kinds of inorganic particles subjected to different surface treatments or two or more kinds of inorganic particles having different particle diameters may be used in a form of a mixture.

Examples of a surface treatment agent include a silane coupling agent, a titanate-based coupling agent, an aluminum-based coupling agent, and a surfactant. In particular, for example, a silane coupling agent is preferable, and a silane coupling agent having an amino group is more preferable.

Examples of the silane coupling agent having an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane; but the present invention is not limited thereto.

The silane coupling agent may be used in a form of a mixture of two or more kinds thereof. For example, the silane coupling agent having an amino group and other silane coupling agents may be used in combination. Examples of the other silane coupling agents include vinyltrimethoxysilane, 3-methacryloxypropyl-tris(2-methoxyethoxy) silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane; but the present invention is not limited thereto.

A surface treatment method using the surface treatment agent may be any method as long as the method is a known method, and any of a dry method or a wet method may be used.

A treatment amount of the surface treatment agent is, for example, preferably 0.5% by mass or more and 10% by mass or less with respect to the inorganic particles.

Here, the undercoat layer may contain an electron-accepting compound (acceptor compound) together with the inorganic particles from the viewpoint of enhancing long-term stability of electrical properties and carrier blocking properties.

Examples of the electron-accepting compound include electron-transporting substances, for example, a quinone-based compound such as chloranil and bromanil; a tetracyanoquinodimethane-based compound; a fluorenone compound such as 2,4,7-trinitrofluorenone and 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, and 2,5-bis(4-diethylaminophenyl)-1,3,4-oxadiazole; a xanthone-based compound; a thiophene compound; a diphenoquinone compound such as 3,3',5,5'-tetra-t-butyldiphenoquinone; and a benzophenone compound.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable; and specifically, anthraquinone, alizarin, quinizarin, anthrarufin, purpurin, or a derivative thereof is preferable.

The electron-accepting compound may be contained in the undercoat layer in a state of being dispersed with the inorganic particles, or in a state of being attached to the surface of the inorganic particles.

Examples of a method of attaching the electron-accepting compound to the surface of the inorganic particles include a dry method and a wet method.

The dry method is, for example, a method of attaching the electron-accepting compound to the surface of the inorganic particles by adding the electron-accepting compound dropwise to the inorganic particles directly or by dissolving the electron-accepting compound in an organic solvent while agitating the inorganic particles with a mixer having a large shearing force and spraying the mixture together with dry air or nitrogen gas. For example, the dropwise addition or spraying of the electron-accepting compound may be performed at a temperature equal to or lower than a boiling point of the solvent. After the dropwise addition or spraying of the electron-accepting compound, the mixture may be further baked at 100° C. or higher. The baking is not particularly limited as long as the temperature and the time are adjusted such that electrophotographic characteristics can be obtained.

The wet method is, for example, a method of attaching the electron-accepting compound to the surface of the inorganic particles by adding the electron-accepting compound to inorganic particles while dispersing the inorganic particles in a solvent by performing agitating or using ultrasonic waves, a sand mill, an attritor, or a ball mill, agitating or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that electrophotographic characteristics can be obtained. In the wet method, the moisture contained in the inorganic particles may be removed before the electron-accepting compound is added, and examples thereof include a method of removing the moisture while agitating and heating the inorganic particles in a solvent and a method of removing the moisture by azeotropically boiling the inorganic particles with a solvent.

The electron-accepting compound may be attached before or after the inorganic particles are subjected to the surface treatment with the surface treatment agent or simultaneously with the surface treatment with the surface treatment agent.

A content of the electron-accepting compound may be, for example, 0.01% by mass or more and 20% by mass or less, preferably 0.01% by mass or more and 10% by mass or less with respect to the inorganic particles.

Examples of the binder resin used for the undercoat layer include a known polymer compound such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin; a zirconium chelate compound; a titanium chelate compound; an aluminum chelate compound; a titanium alkoxide compound; an organic titanium compound; and a known material such as a silane coupling agent.

Examples of the binder resin used for the undercoat layer also include a charge-transporting resin having a charge-transporting group, and a conductive resin (for example, polyaniline or the like).

Among the above, as the binder resin used for the undercoat layer, for example, a resin insoluble in a coating solvent of an upper layer is suitable; and a resin obtained by a reaction between at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin, and a curing agent is particularly suitable.

In a case where these binder resins are used in combination of two or more kinds thereof, a mixing proportion thereof is set as necessary.

The undercoat layer may contain various additives for improving the electrical properties, the environmental stability, and the image quality.

Examples of the additive include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for the surface treatment of the inorganic particles as described above, but may be further added to the undercoat layer as the additive.

Examples of the silane coupling agent as the additive include vinyltrimethoxysilane, 3-methacryloxypropyl-tris (2-methoxyethoxy) silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in a form of a mixture or a polycondensate of a plurality of compounds.

The undercoat layer may have, for example, a Vickers hardness of 35 or more.

For example, the surface roughness (ten-point average roughness) of the undercoat layer may be adjusted to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. In addition, the surface of the undercoat layer may be polished to adjust the surface roughness. Examples of a polishing method include buff polishing, a sandblast treatment, wet honing, and a grinding treatment.

The formation of the undercoat layer is not particularly limited, and a known forming method is used. For example, a coating film of a coating solution for forming the undercoat layer, in which the above-described components are added to a solvent, is formed, and the coating film is dried and then heated as necessary.

Examples of the solvent for preparing the coating solution for forming the undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of the solvent include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming the undercoat layer include known methods such as a roll mill, a ball mill, a vibration ball mill, an attritor, a sand mill, a colloid mill, and a paint shaker.

Examples of the method of coating the conductive substrate with the coating solution for forming the undercoat layer include typical coating methods such as a blade coating method, a wire bar coating method, a spray coating method, a dip coating method, a bead coating method, an air knife coating method, and a curtain coating method.

A film thickness of the undercoat layer is set to, for example, preferably 15 μm or more and more preferably in a range of 20 μm or more and 50 μm or less.

Interlayer

An interlayer may be further provided between the undercoat layer and the photosensitive layer.

The interlayer is, for example, a layer containing a resin. Examples of the resin used for the interlayer include polymer compounds such as an acetal resin (for example, polyvinyl butyral or the like), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, and a melamine resin.

The interlayer may be a layer containing an organometallic compound. Examples of the organometallic compound used for the interlayer include organometallic compounds containing a metal atom such as zirconium, titanium, aluminum, manganese, and silicon.

The compounds used for the interlayer may be used alone or in a form of a mixture or a polycondensate of a plurality of compounds.

Among the above, for example, it is preferable that the interlayer is a layer containing an organometallic compound containing a zirconium atom or a silicon atom.

The formation of the interlayer is not particularly limited, and a known forming method is used. For example, a coating film of a coating solution for forming the interlayer, in which the above-described components are added to a solvent, is formed, and the coating film is dried and then heated as necessary.

Examples of the coating method of forming the interlayer include typical methods such as a dip coating method, a push-up coating method, a wire bar coating method, a spray coating method, a blade coating method, an air knife coating method, and a curtain coating method.

A film thickness of the interlayer is set to, for example, preferably in a range of 0.1 μm or more and 3 μm or less. The interlayer may be used as the undercoat layer.

Charge Generation Layer

A charge generation layer is, for example, a layer containing a charge generation material and a binder resin. In addition, the charge generation layer may be a deposition layer of the charge generation material. The deposition layer of the charge generation material is, for example, appropriate in a case where an incoherent light source such as a light emitting diode (LED) or an organic electroluminescence (EL) image array is used.

Examples of the charge generation material include an azo pigment such as a bisazo pigment and a trisazo pigment; a fused ring aromatic pigment such as dibromoanthanthrone; a perylene pigment; a pyrrolopyrrole pigment; a phthalocyanine pigment; zinc oxide; and trigonal selenium.

Among the above, for example, a metal phthalocyanine pigment or a metal-free phthalocyanine pigment is preferably used as the charge generation material, in order to deal with laser exposure in a near-infrared region. Specifically, for example, hydroxy gallium phthalocyanine, chlorogallium phthalocyanine, dichlorotin phthalocyanine, or titanyl phthalocyanine is more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near-ultraviolet region.

The above-described charge generation material may be used even in a case where a non-coherent light source such as an LED having a central wavelength of light emission in a range of 450 nm or more and 780 nm or less and an organic EL image array is used.

On the other hand, in a case where an n-type semiconductor such as a fused ring aromatic pigment, a perylene pigment, and an azo pigment is used as the charge generation material, a dark current is unlikely to be generated, and image defects referred to as black spots can be suppressed even in a case in which a thin film is used as the photosensitive layer. The n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (polycondensate of bisphenols and aromatic divalent carboxylic acid, or the like), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" means that a volume resistivity is $1\times10^{13}$ Ω·cm or more.

The binder resins may be used alone or in a form of a mixture of two or more kinds thereof.

A blending ratio between the charge generation material and the binder resin is, for example, preferably in a range of 10:1 to 1:10 in terms of mass ratio.

The charge generation layer may also contain other known additives.

The formation of the charge generation layer is not particularly limited, and a known forming method is used. For example, a coating film of a coating solution for forming the charge generation layer, in which the above-described components are added to a solvent, is formed, and the coating film is dried and then heated as necessary. The charge generation layer may be formed by a vapor deposition of the charge generation material. In particular, for example, the formation of the charge generation layer by the vapor deposition is suitable in a case where the fused ring aromatic pigment or the perylene pigment is used as the charge generation material.

Examples of the solvent for preparing the coating solution for forming the charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. The solvents are used alone or in a form of a mixture of two or more kinds thereof.

As a method of dispersing particles (for example, the charge generation material) in the coating solution for forming the charge generation layer, for example, a media disperser such as a ball mill, a vibration ball mill, an attritor, a sand mill, and a horizontal sand mill, or a medialess disperser such as an agitator, an ultrasonic disperser, a roll mill, and a high-pressure homogenizer is used. Examples of the high-pressure homogenizer include a collision type high-pressure homogenizer in which a dispersion liquid is dispersed by a liquid-liquid collision or a liquid-wall collision in a high-pressure state, and a penetration type high-pressure homogenizer in which a dispersion liquid is dispersed by causing the dispersion liquid to penetrate through a micro-flow path in a high-pressure state.

During the dispersion, it is effective to set an average particle diameter of the charge generation material in the coating solution for forming the charge generation layer to 0.5 μm or less, for example, preferably 0.3 μm or less and more preferably 0.15 μm or less.

Examples of the method of coating the undercoat layer (or the interlayer) with the coating solution for forming the charge generation layer include typical methods such as a blade coating method, a wire bar coating method, a spray coating method, a dip coating method, a bead coating method, an air knife coating method, and a curtain coating method.

A film thickness of the charge generation layer is set to, for example, preferably in a range of 0.1 μm or more and 5.0 μm or less and more preferably in a range of 0.2 μm or more and 2.0 μm or less.

Charge Transport Layer

A charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, and anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material also include a positive hole-transporting compound such as a triarylamine-based compound, a benzidine-based compound, an arylalkane-based compound, an aryl-substituted ethylene-based compound, a stilbene-based compound, an anthracene-based compound, and a hydrazone-based compound. The charge transport materials may be used alone or in combination of two or more kinds thereof, but are not limited thereto.

From the viewpoint of charge mobility, for example, a triarylamine derivative represented by Structural Formula (a-1) or a benzidine derivative represented by Structural Formula (a-2) is preferable as the charge transport material.

(a-1)

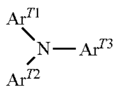

In Structural Formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. In addition, examples of the substituent of each group described above also include a substituted amino group substituted with an alkyl group having 1 or more and 3 or less carbon atoms.

(a-2)

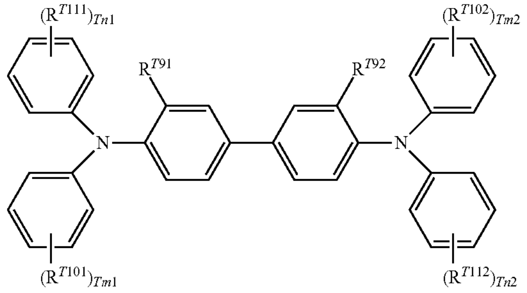

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, an amino group substituted with an alkyl group having 1 or more and 2 or less carbon atoms, a substituted or unsubstituted aryl group, $-C(R^{T12})=C(R^{T13})(R^{T14})$, or $-CH=CH-CH=C(R^{T15})(R^{T16})$, in which $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of the substituent of each group described above include a halogen atom, an alkyl group having 1 or more and 5 or less carbon atoms, and an alkoxy group having 1 or more and 5 or less carbon atoms. In addition, examples of the substituent of each group described above also include a substituted amino group substituted with an alkyl group having 1 or more and 3 or less carbon atoms.

Among the triarylamine derivative represented by Structural Formula (a-1) and the benzidine derivative represented by Structural Formula (a-2), for example, a triarylamine derivative having "$-C_6H_4-CH-CH-CH=C(R^{T7})(R^{T8})$" or a benzidine derivative having "$-CH=CH-CH=C(R^{T15})(R^{T16})$" is particularly preferable from the viewpoint of the charge mobility.

As the polymer charge transport material, known materials having charge transport properties, such as poly-N-vinylcarbazole and polysilane, are used. In particular, for example, a polyester-based polymer charge transport material is particularly preferable. The polymer charge transport material may be used alone or in combination of the binder resin.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among the above, for example, a polycarbonate resin or a polyarylate resin is preferable as the binder resin. The binder resins may be used alone or in combination of two or more kinds thereof.

A blending ratio between the charge transport material and the binder resin is, for example, preferably 10:1 to 1:5 in terms of mass ratio.

The charge transport layer may also contain other known additives.

A known forming method is applied to the formation of the charge transport layer. For example, the charge transport layer is formed by forming a coating film of a coating solution for forming a charge transport layer, in which a material is added to a solvent, drying the coating film, and heating the coating film as necessary.

Examples of the solvent for preparing the coating solution for forming the charge transport layer include organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. The solvents are used alone or in a form of a mixture of two or more kinds thereof.

Examples of the coating method of coating the charge generation layer with the coating solution for forming the charge transport layer include methods such as a blade coating method, a wire bar coating method, a spray coating method, a dip coating method, a bead coating method, an air knife coating method, and a curtain coating method.

A film thickness of the charge transport layer is set to, for example, preferably in a range of 5 μm or more and 50 μm or less and more preferably in a range of 10 μm or more and 30 μm or less.

Single Layer-Type Photosensitive Layer

The single layer-type photosensitive layer is, for example, a layer containing a charge generation material, a charge transport material, and as necessary, a binder resin and other additives. The materials are the same as the materials described in the sections of the charge generation layer and the charge transport layer.

A content of the charge generation material in the single layer-type photosensitive layer may be, for example, 0.1% by mass or more and 10% by mass or less, preferably 0.8% by mass or more and 5% by mass or less with respect to the total solid content.

The content of the charge transport material in the single layer-type photosensitive layer may be, for example, 5% by mass or more and 50% by mass or less with respect to the total solid content.

A method of forming the single layer-type photosensitive layer is the same as the method of forming the charge generation layer or the charge transport layer.

A film thickness of the single layer-type photosensitive layer may be, for example, 5 μm or more and 50 μm or less, preferably 10 μm or more and 40 μm or less.

Cleaning Blade

The cleaning blade may have a single layer structure or a laminated structure in which a plurality of layers are laminated and bonded to each other. For example, it is preferable that the cleaning blade is an elastic body as a base material.

In the cleaning blade, for example, it is preferable that a base material is a polyurethane, and it is more preferable that a base material is urethane rubber.

The polyurethane is generally a polymer of polyisocyanate and polyol.

The polyurethane is, for example, preferably urethane rubber. The 100% modulus of the urethane rubber can be controlled by a content ratio of a hard segment and a soft segment in the urethane rubber.

Examples of the polyisocyanate include 4,4'-diphenylmethane diisocyanate (MDI), 2,6-tolylene diisocyanate (2,6-TDI), 1,6-hexane diisocyanate (HDI), 1,5-naphthalene diisocyanate (NDI), and 3,3'-dimethylbiphenyl-4,4'-diisocyanate (TODI). As the polyisocyanate, for example, MDI, NDI, or HDI is preferable.

Examples of the polyol include polyols contained in the following soft segment material and hard segment material.

As the soft segment material, a polyether polyol is used. Examples of the polyether polyol include polyethylene glycol, poly(oxytetramethylene)glycol, poly(oxypropylene) glycol, and polycaprolactone polyol.

As the soft segment material, polyols other than the polyether polyol may be used. Examples of other polyols include a polyester polyol obtained by a dehydration condensation of a diol and a dibasic acid, and a polycarbonate polyol obtained by a reaction of a diol and an alkyl carbonate.

One kind of the soft segment material may be used alone, or two or more kinds thereof may be used in combination.

As the hard segment material, a chain extender is used. Examples of the chain extender include polyols having a molecular weight of 300 or less, such as 1,4-butanediol, ethylene glycol, diethylene glycol, propylene glycol, dipropylene glycol, hexanediol, 1,4-cyclohexanediol, 1,4-cyclohexanedimethanol, xylene glycol, triethylene glycol, trimethylolpropane, glycerin, pentaerythritol, sorbitol, and 1,2,6-hexanetriol.

One kind of the hard segment material may be used alone, or two or more kinds thereof may be used in combination.

As the hard segment material, a resin having a functional group capable of reacting with an isocyanate group may be used. For example, the resin is preferably a flexible resin, and is preferably a linear aliphatic resin from the viewpoint of flexibility. Examples thereof include an acrylic resin having two or more hydroxyl groups, a polybutadiene resin having two or more hydroxyl groups, and an epoxy resin having two or more epoxy groups.

Examples of the urethane rubber include a diol, a triol, a tetraol, and the like as a crosslinking agent that can be produced by forming a composition obtained by mixing a polyisocyanate, a polyol (for example, the hard segment material and the soft segment material), a crosslinking agent, and a catalyst. Examples of the catalyst include a tertiary amine, a quaternary ammonium salt, and an organic tin compound.

The cleaning blade has, at least, an impregnated cured layer of an isocyanate compound and a silicone-modified acrylic polymer on a contact portion that comes into contact with the surface of the photoreceptor.

The impregnated cured layer is a layer obtained by impregnating a cleaning blade base material with an impregnation treatment liquid containing an isocyanate compound and a silicone-modified acrylic polymer, and curing the impregnating liquid. In other words, the cleaning blade base material is modified with at least an isocyanate compound and a silicone-modified acrylic polymer in the contact portion that comes into contact with the surface of the photoreceptor.

Examples of the isocyanate compound include 4,4'-diphenylmethane diisocyanate (MDI), 2,6-tolylene diisocyanate (2,6-TDI), paraphenylene diisocyanate (PPDI), 1,5-naphthalene diisocyanate (NDI), 3,3'-dimethylbiphenyl-4,4'-diisocyanate (TODI), and polymers and modified products of these compounds.

The silicone-modified acrylic polymer is a resin in which a silicone side chain is bonded to a main chain of a (meth)acrylic polymer. Examples of the silicone-modified acrylic polymer include ACRIT 8BS series of Taisei Fine Chemical Co., Ltd.

A weight-average molecular weight of the silicone-modified acrylic polymer is, for example, preferably 10,000 or more and 100,000 or less, more preferably 20,000 or more and 80,000 or less, and still more preferably 40,000 or more and 60,000 or less.

The impregnation treatment liquid contains the isocyanate compound, the silicone-modified acrylic polymer, and an organic solvent capable of dissolving or dispersing the isocyanate compound and the silicone-modified acrylic polymer. As the organic solvent, for example, an organic solvent having excellent volatility is preferable, and examples thereof include ethyl acetate.

A mass ratio of the isocyanate compound and the silicone-modified acrylic polymer, contained in the impregnation treatment liquid, is, for example, preferably isocyanate compound: silicone-modified acrylic polymer=100:40 to 100:10, more preferably 100:35 to 100:15, and still more preferably 100:30 to 100:20.

The impregnated cured layer is formed by sufficiently drying the surface and the inside of the cleaning blade base material that has been dipped in the impregnation treatment liquid and then pulled up.

Toner

The toner contains toner particles and an external additive that is externally added to the toner particles. The toner is obtained by externally adding the external additive to the toner particles.

Toner Particles

The toner particles are configured to contain, for example, a binder resin, a colorant, a release agent, and other additives.

Binder Resin

Examples of the binder resin include vinyl-based resins including a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

As the binder resin, for example, a polyester resin is suitable.

Examples of the polyester resin include known polyester resins.

Examples of the polyester resin include a polycondensate of a polyvalent carboxylic acid and a polyhydric alcohol. As the polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among the polyvalent carboxylic acids, for example, aromatic dicarboxylic acid is preferable.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these acids, and lower alkyl esters (for example, having 1 or more and 5 or less carbon atoms) of these acids.

One kind of the polyvalent carboxylic acid may be used alone, or two or more kinds thereof may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among the polyhydric alcohols, for example, an aromatic diol or an alicyclic diol is preferable, and an aromatic diol is more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of the polyhydric alcohol may be used alone, or two or more kinds thereof may be used in combination.

The glass transition temperature (Tg) of the polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K 7121-1987, "Testing methods for transition temperatures of plastics".

The weight-average molecular weight (Mw) of the polyester resin is, for example, preferably 5,000 or more and 1,000,000 or less, and more preferably 7,000 or more and 500,000 or less.

The number-average molecular weight (Mn) of the polyester resin is, for example, preferably 2,000 or more and 100,000 or less.

The molecular weight distribution Mw/Mn of the polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC•HLC-8120GPC manufactured by Tosoh Corporation as a measurement device, TSKgel Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The polyester resin is obtained by a known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is distilled off. In a case where a monomer with poor compatibility takes part in the reaction, for example, the monomer with poor compatibility may be condensed in advance with an acid or an alcohol that is to be polycondensed with the monomer, and then polycondensed together with the main component.

A content of the binder resin with respect to the total amount of the toner particles is, for example, preferably 40% by mass or more and 95% by mass or less, more preferably 50% by mass or more and 90% by mass or less, and still more preferably 60% by mass or more and 85% by mass or less.

Colorant

Examples of the colorant include pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye; and inorganic pigments such as a titanium compound and silica.

The colorant is not limited to a substance having absorption in the visible light region. The colorant may be, for example, a substance having absorption in the near-infrared region, or may be a fluorescent colorant.

Examples of the colorant having absorption in the near-infrared region include an aminium salt-based compound, a naphthalocyanine-based compound, a squarylium-based compound, and a croconium-based compound.

Examples of the fluorescent colorant include the fluorescent colorants described in paragraph 0027 of JP2021-127431A.

The colorant may be a photoluminescent colorant. Examples of the photoluminescent colorant include metal powder such as aluminum, brass, bronze, nickel, stainless steel, and zinc; mica coated with titanium oxide or yellow iron oxide; a coated flaky inorganic crystal substrate such as barium sulfate, layered silicate, and silicate of layered aluminum; and monocrystal plate-shaped titanium oxide, basic carbonate, bismuth oxychloride, natural guanine, flaky glass powder, metal-deposited flaky glass powder.

One kind of the colorant may be used alone, or two or more kinds thereof may be used in combination.

As the colorant, a colorant having undergone a surface treatment as necessary may be used, or a dispersant may be used in combination with the colorant.

The toner particles may contain or may not contain a colorant. The toner may be a toner that does not contain a colorant in the toner particles, so-called transparent toner.

In a case where the toner particles contain the colorant, a content of the colorant is, for example, preferably 1% by mass or more and 30% by mass or less and more preferably 3% by mass or more and 15% by mass or less with respect to the total amount of the toner particles.

Release Agent

Examples of the release agent include hydrocarbon-based wax; natural wax such as carnauba wax, rice wax, and candelilla wax; synthetic or mineral petroleum-based wax such as montan wax; and ester-based wax such as fatty acid esters and montanic acid esters. The release agent is not limited to the agents.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total amount of the toner particles is, for example, preferably 1% by mass or more and 20% by mass or less, and more preferably 5% by mass or more and 15% by mass or less.

Other Additives

Examples of other additives include known additives such as a magnetic material, a charge control agent, and an inorganic powder. The additives are incorporated into the toner particles as internal additives.

Characteristics of Toner Particles and the like

The toner particles may be toner particles that have a single-layer structure or toner particles having a so-called core/shell structure that is configured with a core portion (core particle) and a coating layer (shell layer) coating the core portion. For example, the toner particles having a core/shell structure may be configured with a core portion that is configured with a binder resin and other additives used as necessary, such as a colorant and a release agent, and a coating layer that is configured with a binder resin.

The volume-average particle size (D50v) of the toner particles is, for example, preferably 2 μm or more and 10 μm or less, and more preferably 4 μm or more and 8 μm or less.

The average particle size of the toner particles is measured using COULTER MULTISIZER II (manufactured by Beckman Coulter, Inc.) and using ISOTON-II (manufactured by Beckman Coulter, Inc.) as an electrolytic solution. A measurement sample in an amount of 0.5 mg or more and 50 mg or less is added to 2 ml of a 5% by mass aqueous solution of a surfactant (for example, preferably sodium alkylbenzene sulfonate), and the mixture is added to 100 ml or more and 150 ml or less of the electrolytic solution. The electrolytic solution in which the sample is added is subjected to a dispersion treatment for 1 minute with an ultrasonic disperser, and the particle size of the particles is measured in a range of 2 μm or more and 60 μm or less using COULTER MULTISIZER II with an aperture having an aperture size of 100 μm. The number of particles to be sampled is 50,000. A volume distribution or a number distribution is drawn from a small size side based on the measured particle size distribution, and a particle size having a cumulative percentage of 50% is defined as the volume-average particle size D50v or the number-average particle size D50p.

External Additive

Examples of the external additive include inorganic particles. Examples of the inorganic particles include $SiO_2$, $TiO_2$, $Al_2O_3$, $SrTiO_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, and $MgSO_4$.

The surface of the inorganic particles may have undergone, for example, a hydrophobization treatment. The hydrophobic treatment is performed, for example, by dipping the inorganic particles in a hydrophobic agent. Examples of the hydrophobic agent include a silane-based coupling agent, silicone oil, a titanate-based coupling agent, and an aluminum-based coupling agent. One kind of each of the agents may be used alone, or two or more kinds of the agents may be used in combination.

The amount of the hydrophobic agent is, for example, 1 part by mass or more and 10 parts by mass or less with respect to 100 parts by mass of the inorganic particles.

Examples of the external additive also include resin particles such as polystyrene, polymethylmethacrylate, and melamine resins; and cleaning activators such as metal salt particles of a higher fatty acid represented by zinc stearate, and fluorine-based polymer particles.

The amount of external additives externally added with respect to the mass of the toner particles is, for example, preferably 0.01% by mass or more and 10% by mass or less, and more preferably 0.01% by mass or more and 6.0% by mass or less.

Developer

The developer may be a one-component developer containing only a toner or a two-component developer obtained by mixing a toner and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing magnetic powder in a matrix resin and mixing the powder and the resin together; and a resin impregnation-type carrier obtained by impregnating porous magnetic powder with a resin. The magnetic powder dispersion-type carrier or the resin impregnation-type carrier may be a carrier obtained by coating the surface of a core material with a resin.

Examples of the magnetic powder include magnetic metals such as iron, nickel, and cobalt; and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene/acrylic acid ester copolymer, a straight silicone resin configured with an organosiloxane bond, a product obtained by modifying the straight silicone resin, a fluororesin, polyester, polycarbonate, a phenol resin, and an epoxy resin. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

Examples of a method of coating the surface of the core material with a resin include a method of using a solution for forming a coating layer obtained by dissolving the coating resin and various additives (used as necessary) in an appropriate solvent. The solvent is not particularly limited, and may be selected in consideration of the type of the resin used, coating suitability, and the like.

Specifically, examples of the resin coating method include a dipping method of dipping the core material in the solution for forming a coating layer; a spray method of spraying the solution for forming a coating layer to the surface of the core material; a fluidized bed method of spraying the solution for forming a coating layer to the core material that is floating by an air flow; and a kneader coater method of mixing the core material of the carrier with the solution for forming a coating layer in a kneader coater and then removing solvents.

The mixing ratio (mass ratio) between the toner and the carrier, represented by toner: carrier, in the two-component developer is, for example, preferably 1:100 to 30:100, and more preferably 3:100 to 20:100.

EXAMPLES

Hereinafter, the present exemplary embodiments will be specifically described based on Examples. However, the present exemplary embodiments are not limited to Examples. In the following description, unless otherwise specified, "parts" and "%" are based on mass.

In the following description, the synthesis, the treatment, the production, the test, and the like are carried out at room temperature (25° C.±3° C.) unless otherwise specified.

Production of Photoreceptor

Photoreceptor (1)

Formation of Undercoat Layer 100 parts of zinc oxide (average primary particle diameter: 70 nm, TAYCA Corporation) is mixed with 500 parts of toluene by stirring, 1.5 parts of a silane coupling agent (trade name: KBM603, Shin-Etsu Chemical Co., Ltd.) is added thereto, and the mixture is stirred for 2 hours. Next, the toluene is distilled off by vacuum distillation, and the mixture is baked at 150° C. for 2 hours.

25 parts of methyl ethyl ketone is mixed with 38 parts of a liquid composition that is obtained by dispersing and dissolving 60 parts of the zinc oxide subjected to the surface treatment, 15 parts of a curing agent (blocked isocyanate, trade name: SUMIDUR BL3175, Sumitomo Bayer Urethane Co., Ltd.), and 15 parts of a butyral resin (trade name: BM-1, Sekisui Chemical Co., Ltd.) in 85 parts of methyl ethyl ketone, thereby obtaining a liquid to be treated.

Glass beads (Hi-Bea D20, Ohara Inc.) having a diameter of 1 mm are put into a cylinder of a horizontal media mill disperser (KDL-PILOT type, DYNO-MILL, Shinmaru Enterprises Corporation) such that the cylinder is filled with the glass beads at a filling rate of 80% by volume. A peripheral speed of an agitator mill of the disperser is set to 8 m/min, and a flow rate of the liquid to be treated is set to 1,000 mL/min, and the dispersion treatment is performed in a circulating manner. A magnetic gear pump is used for feeding the liquid to be treated to the disperser.

0.005 parts of dioctyltin dilaurate as a catalyst and 0.01 parts of silicone oil (trade name: SH29PA, Toray Dow Corning Silicone Co., Ltd.) are added to the dispersion obtained by the above-described treatment, thereby preparing a coating solution for an undercoat layer. An aluminum substrate having a diameter of 84 mm, a length of 340 mm, and a thickness of 1 mm is coated with the coating solution for an undercoat layer by a dip coating method, and dried and cured at 160° C. for 100 minutes, thereby forming an undercoat layer having a film thickness of 20 μm.

Formation of Charge Generation Layer

A mixture of 15 parts of chlorogallium phthalocyanine (having a diffraction peak at a Bragg angle (2θ±0.2°) of at least 7.4°, 16.6°, 25.5°, and 28.3° in an X-ray diffraction spectrum using CuKα ray), 10 parts of a vinyl chloride-vinyl acetate copolymer resin (product name: VMCH, Nippon Unicar Company Limited), and 300 parts of n-butyl acetate is dispersed in a sand mill for 4 hours using glass beads having a diameter of 1 mmφ, thereby obtaining a coating solution for a charge generation layer. The undercoat layer is dipped in and coated with the coating solution for a charge generation layer, and dried to form a charge generation layer having a film thickness of 0.2 μm.

Formation of Charge Transport Layer 4 parts of N,N'-diphenyl-N,N'-bis(3-methylphenyl)-[1,1']biphenyl-4,4'-diamine and 6 parts of a bisphenol Z polycarbonate resin (viscosity-average molecular weight: 40,000) are dissolved in 80 parts of chlorobenzene, thereby obtaining a coating solution for a charge transport layer. The charge generation layer is coated with the coating solution for a charge transport layer, and dried at 130° C. for 40 minutes to form a charge transport layer having a film thickness of 25 μm.

Formation of Inorganic Surface Layer (Gallium Oxide Layer)

The photoreceptor formed up to the charge transport layer is introduced into a plasma CVD device, and the inside of the vacuum chamber is evacuated to a pressure of 1× 10-2 Pa. Hydrogen gas, He-diluted oxygen (oxygen concentration: 4%), and hydrogen-diluted trimethylgallium (trimethylgallium concentration: approximately 10%) are supplied from a gas supply pipe to the vacuum chamber through a mass flow controller. Flow rates of the hydrogen gas, the He-diluted oxygen, and the hydrogen-diluted trimethylgallium are set to 200 sccm, 5 sccm, and 5 sccm, respectively. The pressure in the vacuum chamber is adjusted to 10 Pa by adjusting a conductance valve together with the gas supply, and discharge is performed from a discharge electrode. The photoreceptor is rotated at a speed of 20 rpm to form a gallium oxide layer on the charge transport layer.

Photoreceptor (2)

An aluminum oxide layer is formed on the charge transport layer in the same manner as in the production of the photoreceptor (1), except that the trimethylgallium is changed to trimethylaluminum in the formation of the inorganic surface layer.

Photoreceptor (3)

The photoreceptor (1) before the formation of the inorganic surface layer is used as a photoreceptor (3). That is, a surface layer of the photoreceptor (3) is the charge transport layer.

Production of Cleaning Blade

Cleaning Blade (1)

Production of Base Material 100 parts of polycaprolactone polyol (molecular weight: 2,000) and 57 parts of 4,4'-diphenylmethane diisocyanate (MDI, DIC Corporation) are reacted with each other at 115° C. for 20 minutes. Next, 6 parts of 1,4-butanediol and 2.5 parts of trimethylolpropane are mixed therewith. The mixture is charged into a mold kept at 140° C., and heated and cured for 40 minutes, thereby obtaining urethane rubber.

The urethane rubber is cut into a length of 330 mm, a width of 13.5 mm, and a thickness of 1.9 mm, thereby obtaining a urethane rubber sheet. Two urethane rubber sheets are bonded to each other with an adhesive, thereby obtaining a base material for a cleaning blade. At one end of the base material, a contact portion that comes into contact with the surface of the photoreceptor is laser-processed such that a tip angle is 80 degrees.

Production of Impregnation Treatment Liquid 25 parts of 4,4'-diphenylmethane diisocyanate (MDI, "MILLIONATE MT" of Toray Industries, Inc.), 5 parts of a silicone-modified acrylic polymer (8BS-9000, Taisei Fine Chemical Co., Ltd.), and 80 parts of ethyl acetate are mixed together in a ball mill for 5 hours, thereby obtaining an impregnation treatment liquid.

Formation of Impregnated Cured Layer

A liquid temperature of the impregnation treatment liquid is adjusted to 23° C., and the base material is dipped in the impregnation treatment liquid for 60 seconds while maintaining the liquid temperature at 23° C. Next, the blade is dried at room temperature for 1 minute, the surface of the blade is wiped with a sponge containing a small amount of toluene, and then the blade is left in a constant temperature bath at a temperature of 25° C. for 50 minutes to form an impregnated cured layer.

Cleaning Blades (2) to (6)

Cleaning blades (2) to (6) are produced in the same manner as in the production of the cleaning blade (1), except that the amount of MDI used for producing the base material is changed as shown in Table 1.

Cleaning Blade (7)

The base material of the cleaning blade (1) is used as a cleaning blade (7). That is, the cleaning blade (7) is a cleaning blade that does not have the impregnated cured layer.

Cleaning Blades (8) to (13)

Cleaning blades (8) to (13) are produced in the same manner as in the production of the cleaning blade (1), except that the tip angle is changed as shown in Table 1.

Production of Image Forming Apparatus

Examples 1 to 12 and Comparative Examples 1 to 8

One of the photoreceptors (1) to (3) and one of the cleaning blades (1) to (13) are mounted on an image forming apparatus Apeos C8180 (FUJIFILM Business Innovation Corp.) in the combinations listed in Table 1. An action angle of the cleaning blade with respect to the surface of the photoreceptor is adjusted to the angle described in Table 1.

A developing device of each color is filled with a developer containing an externally added toner of silica particles of each color.

Performance Evaluation

Using the above-described image forming apparatus, an image having an image density of 7% is output on 50,000 sheets of A4 plain paper in a low-temperature and low-humidity environment of a temperature of 10° C. and a relative humidity of 15%. The photoreceptor and the cleaning blade after the output are evaluated by the following evaluation method. The results are shown in Table 1.

The low-temperature and low-humidity environment is an environment in which the urethane rubber is to be relatively hard, and is an environment in which an external additive dam is unlikely to be formed on the contact portion of the cleaning blade. Therefore, the low-temperature and low-humidity environment is an environment in which the external additive is likely to slip through the cleaning blade.

Abrasion of Photoreceptor

A layer thickness of the photoreceptor is measured with an eddy current type film thickness meter before and after the image formation. A difference between the amount of abrasion before and after the image formation, that is, the amount of abrasion is calculated, and classified as follows.

A: 0.6 μm or less

B: more than 0.6 μm and 0.8 μm or less

C: more than 0.8 μm and 1.2 μm or less

D: more than 1.2 μm and 1.6 μm or less

E: more than 1.6 μm

Abrasion of Cleaning Blade

A shape of the tip of the cleaning blade is observed with a laser microscope (KEYENCE CORPORATION, VK-9500). A difference, that is, the amount of abrasion is obtained by comparing the shape at the time of design, and classified as follows.

A: 1.7 $\mu m^2$ or less

B: more than 1.7 $\mu m^2$ and 2.0 $\mu m^2$ or less

C: more than 2.0 $\mu m^2$ and 2.3 $\mu m^2$ or less

D: more than 2.3 $\mu m^2$ and 3.0 $\mu m^2$ or less

E: more than 3.0 $\mu m^2$

Filming of Photoreceptor

The surface of the photoreceptor is observed with a laser microscope (KEYENCE CORPORATION, VK-9500). A coating state by filming is classified as follows.

A: no filming has occurred.

B: slight filming has occurred, but is at a sufficiently acceptable level in practical use.

C: filming has occurred, but is at an acceptable level in practical use.

D: filming has occurred, and is at an unacceptable level in practical use.

E: extensive filming has occurred, and is at an unacceptable level in practical use.

TABLE 1

| | Photoreceptor | | Cleaning blade | | | | | |
|---|---|---|---|---|---|---|---|---|
| | | Inorganic | | | Impregnation treatment liquid | | | |
| | No. — | surface layer Type of Group 13 element — | No. — | Base material MDI Part by mass | Isocyanate compound Part by mass | Silicone-modified acrylic polymer Part by mass | Ethyl acetate Part by mass | 100% Modulus MPa |
| Comparative Example 1 | (3) | — | (1) | 57 | 25 | 5 | 80 | 16 |
| Comparative Example 2 | (3) | — | (7) | 57 | | — | | 10 |
| Comparative Example 3 | (1) | Ga | (7) | 57 | | — | | 10 |
| Example 2 | (1) | Ga | (2) | 51 | 25 | 5 | 80 | 13 |
| Example 1 | (1) | Ga | (1) | 57 | 25 | 5 | 80 | 16 |
| Example 3 | (1) | Ga | (3) | 59 | 25 | 5 | 80 | 19 |
| Example 4 | (1) | Ga | (4) | 61 | 25 | 5 | 80 | 21 |
| Example 5 | (1) | Ga | (5) | 62 | 25 | 5 | 80 | 22 |
| Comparative Example 4 | (1) | Ga | (6) | 64 | 25 | 5 | 80 | 23 |
| Comparative Example 5 | (1) | Ga | (8) | 57 | 25 | 5 | 80 | 16 |
| Example 6 | (1) | Ga | (9) | 57 | 25 | 5 | 80 | 16 |
| Example 7 | (1) | Ga | (10) | 57 | 25 | 5 | 80 | 16 |
| Example 8 | (1) | Ga | (11) | 57 | 25 | 5 | 80 | 16 |
| Example 9 | (1) | Ga | (12) | 57 | 25 | 5 | 80 | 16 |
| Comparative Example 6 | (1) | Ga | (13) | 57 | 25 | 5 | 80 | 16 |
| Comparative Example 7 | (1) | Ga | (1) | 57 | 25 | 5 | 80 | 16 |
| Example 10 | (1) | Ga | (1) | 57 | 25 | 5 | 80 | 16 |
| Example 11 | (1) | Ga | (1) | 57 | 25 | 5 | 80 | 16 |
| Comparative Example 8 | (1) | Ga | (1) | 57 | 25 | 5 | 80 | 16 |
| Example 12 | (2) | Al | (1) | 57 | 25 | 5 | 80 | 16 |

TABLE 1-continued

| | Cleaning | System | | Evaluation | | |
|---|---|---|---|---|---|---|
| | blade Tip angle Degree | Action angle Degree | Coefficient of dynamic friction — | Abrasion of photo-receptor — | Abrasion of blade — | Filming of photo-receptor — |
| Comparative Example 1 | 80 | 13 | 0.82 | E | D | D |
| Comparative Example 2 | 80 | 13 | 0.94 | E | E | E |
| Comparative Example 3 | 80 | 13 | 0.79 | D | E | E |
| Example 2 | 80 | 13 | 0.57 | A | B | A |
| Example 1 | 80 | 13 | 0.52 | A | A | A |
| Example 3 | 80 | 13 | 0.51 | A | A | B |
| Example 4 | 80 | 13 | 0.47 | A | A | C |
| Example 5 | 80 | 13 | 0.46 | A | A | C |
| Comparative Example 4 | 80 | 13 | 0.40 | A | A | D |
| Comparative Example 5 | 58 | 13 | 0.70 | B | D | D |
| Example 6 | 60 | 13 | 0.60 | A | C | C |
| Example 7 | 70 | 13 | 0.58 | A | B | B |
| Example 8 | 84 | 13 | 0.55 | A | A | B |
| Example 9 | 87 | 13 | 0.55 | A | A | B |
| Comparative Example 6 | 90 | 13 | 0.45 | C | B | E |
| Comparative Example 7 | 80 | 7 | 0.50 | B | B | D |
| Example 10 | 80 | 8 | 0.58 | A | B | C |
| Example 11 | 80 | 28 | 0.58 | A | B | A |
| Comparative Example 8 | 80 | 31 | 0.71 | D | D | D |
| Example 12 | 80 | 13 | 0.56 | A | A | A |

The image forming apparatus according to the present disclosure includes the following aspects.

SUPPLEMENTARY NOTES (((1)))

An image forming apparatus comprising:

a photoreceptor;

a charging device that charges a surface of the photoreceptor;

an electrostatic latent image forming device that forms an electrostatic latent image on the surface of the photoreceptor;

a developing device that contains a developer containing a toner and develops the electrostatic latent image formed on the surface of the photoreceptor to form a toner image;

a transfer device that transfers the toner image to a surface of a recording medium; and a cleaning device that has a cleaning blade coming into contact with the surface of the photoreceptor to clean the surface of the photoreceptor, wherein the photoreceptor has an inorganic surface layer containing a Group 13 element and an oxygen element, the cleaning blade has an impregnated cured layer of an isocyanate compound and a silicone-modified acrylic polymer at a contact portion in contact with the surface of the photoreceptor, a 100% modulus of the cleaning blade is 13 MPa or more and 22 MPa or less, a tip angle of the cleaning blade is 60 degrees or more and 87 degrees or less, and an action angle of the cleaning blade with respect to the surface of the photoreceptor is 8 degrees or more and 30 degrees or less.

(((2)))

The image forming apparatus according to (((1))

wherein a coefficient of dynamic friction between the surface of the photoreceptor and the contact portion of the cleaning blade is 0.3 or more and 0.6 or less.

(((3)))

The image forming apparatus according to (((1))) or (((2))), wherein the 100% modulus of the cleaning blade is 13 MPa or more and 18 MPa or less.

(((4)))

The image forming apparatus according to any one of (((1))) to (((3)))), wherein the tip angle of the cleaning blade is 80 degrees or more and 85 degrees or less.

(((5))

The image forming apparatus according to any one of (((1))) to (((4))), wherein the inorganic surface layer of the photoreceptor is a layer containing an oxide of the Group 13 element.

(((6)))

The image forming apparatus according to any one of (((1))) to ((5))

wherein the inorganic surface layer of the photoreceptor is a gallium oxide layer.

(((7)))

The image forming apparatus according to any one of (((1))) to (6)))

wherein a base material of the cleaning blade is a polyurethane.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a photoreceptor;

a charging device that charges a surface of the photoreceptor;

an electrostatic latent image forming device that forms an electrostatic latent image on the surface of the photoreceptor;

a developing device that contains a developer containing a toner and develops the electrostatic latent image formed on the surface of the photoreceptor to form a toner image;

a transfer device that transfers the toner image to a surface of a recording medium; and a cleaning device that has a cleaning blade coming into contact with the surface of the photoreceptor to clean the surface of the photoreceptor, wherein the photoreceptor has an inorganic surface layer containing a Group 13 element and an oxygen element, the cleaning blade has an impregnated cured layer of an isocyanate compound and a silicone-modified acrylic polymer at a contact portion in contact with the surface of the photoreceptor, a 100% modulus of the cleaning blade, as measured in accordance with JIS K 6251:2017 using a No. 3 dumbbell shape test piece at a temperature of 23° C. and a relative humidity of 55% with a tensile rate of 500 mm/min, is 13 MPa or more and 22 MPa or less, a tip angle of the cleaning blade, which is an angle of a corner portion of the cleaning blade defined in a state where the cleaning blade is not in contact with the photoreceptor, is 60 degrees or more and 87 degrees or less, and an action angle of the cleaning blade with respect to the surface of the photoreceptor, defined as an angle formed by a tangent line with respect the cleaning blade and a tangent line with respect to the photoreceptor that pass through a contact point between the cleaning blade and the photoreceptor, is 8 degrees or more and 30 degrees or less.

2. The image forming apparatus according to claim 1, wherein a coefficient of dynamic friction between the surface of the photoreceptor and the contact portion of the cleaning blade is 0.3 or more and 0.6 or less.

3. The image forming apparatus according to claim 1, wherein the 100% modulus of the cleaning blade is 13 MPa or more and 18 MPa or less.

4. The image forming apparatus according to claim 1, wherein the tip angle of the cleaning blade is 80 degrees or more and 85 degrees or less.

5. The image forming apparatus according to claim 1, wherein the inorganic surface layer of the photoreceptor is a layer containing an oxide of the Group 13 element.

6. The image forming apparatus according to claim 1, wherein the inorganic surface layer of the photoreceptor is a gallium oxide layer.

7. The image forming apparatus according to claim 1, wherein a base material of the cleaning blade is a polyurethane.

* * * * *